United States Patent
Fujino et al.

[11] Patent Number: 6,075,098
[45] Date of Patent: Jun. 13, 2000

[54] PNEUMATIC TIRE COMPRISING A FOAMED RUBBER LAYER CONTAINING A VULCANIZATION ACCELERATOR AND COMPRISING A CLOSED CELL AND SOLID RUBBER PHASE

[75] Inventors: Kentaro Fujino; Hideki Matsui, both of Tokyo, Japan

[73] Assignee: Bridgestone Corporation, Tokyo, Japan

[21] Appl. No.: 08/892,846

[22] Filed: Jul. 11, 1997

[30] Foreign Application Priority Data

Jul. 11, 1996 [JP] Japan .................................. 8-182392

[51] Int. Cl.[7] .............................. C08C 19/20; B60C 11/00
[52] U.S. Cl. ......................... 525/349; 152/209.7
[58] Field of Search ................ 525/349, 332.7; 152/209.7, 564

[56] References Cited

U.S. PATENT DOCUMENTS

| | | | |
|---|---|---|---|
| 2,955,102 | 10/1960 | Clayton | 525/349 |
| 3,086,018 | 4/1963 | Hardman | 525/349 |

FOREIGN PATENT DOCUMENTS

| | | |
|---|---|---|
| 0673792 | 9/1995 | European Pat. Off. . |
| 49-93361 | 9/1974 | Japan . |
| 58-87138 | 5/1983 | Japan .................. C08L 9/06 |

OTHER PUBLICATIONS

Abstract, (JP 58 087 138 A) Databse WPI, Section Ch, Week 8326, Derwent Publications, Ltd., May 24, 1983.

*Primary Examiner*—Christopher Henderson
*Attorney, Agent, or Firm*—Sughrue, Mion, Zinn, Macpeak & Seas, PLLC

[57] ABSTRACT

A pneumatic tire comprising a tire tread wherein a foamed rubber layer is provided at least in the portion substantially contacting with a road surface, and wherein said foamed rubber layer, which has closed cells, has an expansion ratio of about 2% to about 50%, and the solid rubber phase in said foamed rubber layer contains, in an amount of about 0.5 to about 5 parts by weight per 100 parts by weight of the rubber component, a vulcanization accelerator represented by one of the following general formula:

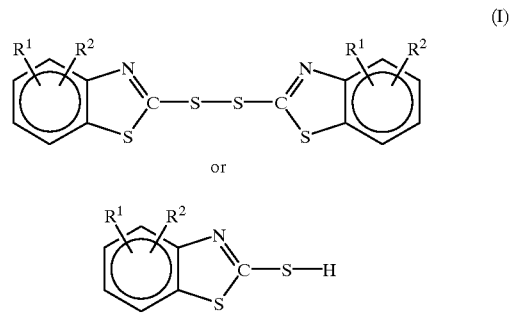

wherein $R^1$ and $R^2$ each independently represents an atom or a group selected from a group consisting of a hydrogen atom, alkyl groups, and aryl groups, excluding a case in which each of $R^1$ and $R^2$ simultaneously represents a hydrogen atom. The pneumatic tire which is used as an excellent studless tire suppresses deterioration in performance on ice or snow in the final period of tire use compared to the performance in the initial period of tire use.

8 Claims, No Drawings

PNEUMATIC TIRE COMPRISING A FOAMED RUBBER LAYER CONTAINING A VULCANIZATION ACCELERATOR AND COMPRISING A CLOSED CELL AND SOLID RUBBER PHASE

BACKGROUND OF THE INVENTION

1. Field of the Invention

The present invention relates to a pneumatic tire, and more particularly, to a pneumatic tire used as an excellent studless tire which shows little variation in startup/braking ability and controllability on icy and snowy road surfaces between initial and final periods of tire use.

2. Description of Related Art

In a conventional pneumatic tire, the area of the tire contacting with icy or snowy road surfaces is increased by decreasing the hardness of the tread rubber for attaining startup/braking ability and controllability of the pneumatic tire on icy or snowy road surfaces. More specifically, a polymer having a low glass transition temperature is used in the tread rubber composition, a softener is added to the tread rubber composition, or a foamed rubber is used in the tread. When a foamed rubber is used as the tread rubber, it is found that sufficient performance on icy or snowy road surfaces cannot always be exhibited in the final period of tire use because the tread rubber composition is hardened during driving, and the area contacting with icy or snowy road surfaces is decreased, although the decrease is less significant than that of a tread in which a foamed rubber is not used. It is disclosed in Japanese Patent Application Laid-Open No. 58-87138 that, in a conventional tire, a rubber composition containing a specific vulcanization accelerator and a specific antioxidant shows improvement in hardening under heating, and in the appearance of a tire in the final period of use. However, nothing is mentioned about a tire having a foamed tread and the performance of a tire having a foamed tread on ice or snow.

The main factor related to hardening has been found to be the additional crosslinking reaction caused by sulfur and vulcanization accelerators which remain in the rubber. In conventional technology, suppressing hardening caused by the additional crosslinking reaction in a foamed tread of a tire is considered to be difficult, and no means for suppressing deterioration in performance in the final period of tire use has been known.

Because such a deterioration in performance takes place, performance on ice or snow in the final period of tire use has heretofore been maintained by enhancing performance in the initial period still more to compensate for the deterioration. For this purpose, a large amount of a polymer having a low glass transition temperature, such as polybutadiene, is used for lowering hardness in the initial period. However, this method causes a formation of uneven wear in the final period of tire use and a decrease in the area in contact with icy and snowy surfaces, and this becomes another reason for deterioration in performance on ice or snow in the final period of tire use.

SUMMARY OF THE INVENTION

Accordingly, the present invention has been conducted under the above circumstances with an object of suppressing hardening of the tread rubber composition itself in the final period of tire use by suppressing the additional crosslinking reaction and providing a pneumatic tire used as a studless tire which has excellent startup/braking ability and controllability in the final period of tire use.

By analyzing the hardening phenomenon of foamed rubbers in treads of tires, the novel knowledge was acquired revealing that the main factor causing hardening is the additional crosslinking caused by sulfur and that this additional crosslinking and performance on ice or snow are related, and it was discovered based on this knowledge that problems can be overcome by the means explained below. The present invention has been completed based on this discovery.

Accordingly, the present invention provides a pneumatic tire comprising a tire tread wherein a foamed rubber layer is provided at least in the portion where substantially contacts with a road surface, and said foamed rubber layer, which has closed cells, has an expansion ratio of about 2% to about 50%, and the solid rubber phase in said foamed rubber layer contains, in an amount of about 0.5 to substantially contacts with a road surface, and said foamed rubber layer, which has closed cells, has an expansion ratio of about 2% to about 50%, and the solid rubber phase in said foamed rubber layer contains, in an amount of about 0.5 to about 5 parts by weight per 100 parts by weight of the rubber component, a vulcanization accelerator represented by one of the following general formula:

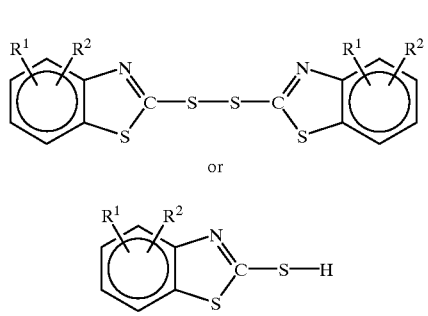

(I)

or wherein $R^1$ and $R^2$ each independently represents an atom or a group selected from a group consisting of a hydrogen atom, alkyl groups, and aryl groups, excluding a case in which each of $R^1$ and $R^2$ simultaneously represents a hydrogen atom.

DETAILED DESCRIPTION OF THE INVENTION

The above expansion ratio Vs of a foamed rubber can be expressed by the following equation:

$$Vs=\{(\rho_0-\rho_g)/(\rho_1-\rho_g)-1\}\times 100(\%) \qquad (1)$$

wherein $\rho_1$ represents the density of the foamed rubber (g/cm$^3$), $\rho_0$ represents the density of the portion of the solid rubber phase in the foamed rubber (g/cm$^3$), and $\rho_g$ represents the density of the gas contained in the cells of the foamed rubber (g/cm$^3$).

The foamed rubber is composed of a portion of solid rubber phase and cavities (closed cells) formed by the portion of solid rubber phase, i.e., portions of a gas in the cells.

The density of the gas contained in cells is very small, i.e., substantially zero, and is also negligibly small in comparison with the density of the portion of the solid rubber phase $\rho_0$. Therefore, equation (1) is substantially the same as the following equation:

$$Vs=(\rho_0/\rho_1-1)\times 100(\%) \qquad (2)$$

The expansion ratio is about 2% to about 50%, preferably about 10% to about 40%. When the expansion ratio is less than 2%, the sufficient effect of improving performance on ice or snow cannot be exhibited. When the expansion ratio exceeds 50%, abrasion resistance is decreased, moreover, the ability of the foamed rubber to recover from strain is decreased, in return causing a decrease in so-called permanent set resistance, and further it is difficult to obtain a stable shape in production.

The foamed rubber used in the tread of the pneumatic tire of the present invention is formed by applying heat and pressure to a rubber composition containing a foaming agent in accordance with a conventional process for producing a tire.

Examples of the foaming agent include azo compounds, such as azodicarbon amide and azobisisobutyronitrile; nitroso compounds, such as dinitrosopentamethylenetetramine; and sulfonylhydrazide compounds, such as benzenesulfonylhydrazide, toluenesulfonylhydrazide, other aromatic sulfonylhydrazides, derivatives of these compounds, and p,p'-oxybis(benzenesulfonylhydrazide). Among these compounds, dinitrosopentamethylenetetramine is preferable in view of the control of the cell diameter. Urea, for example, can be used as an auxiliary foaming agent.

One of the characteristics of the present invention is that by combining a foaming agent and the vulcanization accelerator specified in the present invention, the cell diameter and the expansion ratio in the foamed rubber layer in the tread can be controlled to optimum values, and performance on ice or snow of the tire having the foamed rubber layer can be improved.

It is necessary that the foamed rubber comprise about 0.5 to about 5 parts by weight of a vulcanization accelerator represented by one of the previously mentioned general formula per 100 parts by weight of the rubber composition in the solid phase. When the amount of the vulcanization accelerator is less than 0.5 parts by weight, the effect of suppressing hardening of the tread is low, and deterioration in performance in the final period of tire use cannot be suppressed. When the vulcanization accelerator is used in an amount exceeding 5 parts by weight, no further increase in the effect can be found, and an amount larger than the above range is not effective, either, from the standpoint of economy.

In the previously mentioned general formula representing the vulcanization accelerator of the present invention, $R^1$ and $R^2$ each independently represents a hydrogen atom, an alkyl group, or an aryl group, excluding a case in which each of $R^1$ and $R^2$ simultaneously represents a hydrogen atom. $R^1$ and $R^2$ preferably each independently represents a hydrogen atom, an alkyl group having 1 to 6 carbon atoms, or an aryl group having 6 to 10 carbon atoms, and more preferably, each independently represents a hydrogen atom, a methyl group, an ethyl group, or a phenyl group.

Examples of the vulcanization accelerator include 2-mercapto-4-methylbenzothiazole, 2-mercapto-4-ethylbenzothiazole, 2-mercapto-5-methylbenzothiazole, 2-mercapto-5-ethylbenzothiazole, 2-mercapto-6-methylbenzothiazole, 2-mercapto-6-ethylbenzothiazole, 2-mercapto-4,5-dimethylbenzothiazole, 2-mercapto-4,5-diethylbenzothiazole, 2-mercapto-4-phenylbenzothiazole, 2-mercapto-5-phenylbenzothiazole, 2-mercapto-6-phenylbenzothiazole, bis(4-methylbenzothiazolyl-2)-disulfide, bis(4-ethylbenzo-thiazolyl-2)-disulfide, bis(5-methylbenzothiazolyl-2)-disulfide, bis(5-ethylbenzothiazolyl-2)-disulfide, bis(6-methylbenzothiazolyl-2)-disulfide, bis(6-ethylbenzo-thiazolyl-2)-disulfide, bis(4,5-dimethylbenzothiazolyl-2)-disulfide, bis(4,5-diethylbenzothiazolyl-2)-disulfide, bis(4-phenylbenzothiazolyl-2)-disulfide, bis(5-phenyl-benzothiazolyl-2)-disulfide, and bis(6-phenylbenzo-thiazolyl-2)-disulfide. Among these compounds, bis (monoalkylbenzothiazolyl-2)-disulfides and 2-mercaptomonoalkylbenzothiazoles are preferable, and bis(4-methylbenzothiazolyl-2)-disulfide, bis(5-methylbenzo-thiazolyl-2)-disulfide, 2-mercapto-4-methylbenzothiazole, and 2-mercapto-5-methylbenzothiazole are more preferable. Any of these can be used singly or in combination of two or more.

The process for producing the vulcanization accelerator is not particularly limited. For example, the vulcanization accelerator can easily be produced in accordance with the process described in Japanese Patent Application Laid-Open No. 49-93361 and the like.

In the pneumatic tire of the present invention, the layer of a foamed rubber in the tread preferably has a JIS-A hardness of 65 or less in the initial period of tire use. When hardness exceeds 65, the area contacting icy or snowy road surfaces decreases, causing a deterioration in performance on ice or snow in the initial period of tire use.

In the solid-phase rubber composition of the present invention, components generally used in rubber compositions for tires can suitably be comprised in combination with the above essential components within the range in which the effectiveness of the present invention is not adversely affected. Such components include a rubber component, such as natural rubber; synthetic rubbers, such as isoprene rubber, butadiene rubber, butyl rubber (including halogenated butyl rubber), and ethylene-propylene rubber; a reinforcing filler, such as carbon black and silica; zinc oxide; stearic acid; antioxidants; waxes; silane coupling agents; oils; and vulcanizing agents.

Sulfur can be used as a vulcanizing agent. The amount of the vulcanizing agent is 0.1 to 5 parts by weight, preferably 0.5 to 2 parts by weight, per 100 parts by weight of the rubber component. When the amount is less than 0.1 part by weight, the strength at rupture and the abrasion resistance of the vulcanized rubber are decreased.

When the amount exceeds 5 parts by weight, rubber elasticity is lost.

The rubber composition of the present invention can be obtained by mixing the components using a mixing machine, such as a roller, an internal mixer, and a Bambury mixer. The rubber composition is used for a tire tread after forming and vulcanization, and thus used for the pneumatic tire of the present invention.

EXAMPLES

The invention will be described in more detail with reference to examples below. The present invention is not, however, limited by the examples.

Various measurements were conducted in accordance with the following methods.

(1) Braking Ability On Ice in the Initial Period of Tire Use

A test tire was installed on a passenger car having a cylinder displacement of 1,800 cc and the car was driven on an ordinary public road for a distance of 500 km. For the test, after the test tire was installed on a passenger car having a cylinder displacement of 1,800 cc, the braking distance was measured on ice at an outside air temperature of −5° C. by applying the brake on the car at a speed of 20 km/h. The result is expressed by an index with reference to the value obtained in Comparative Example 1, which is set to 100. The higher the value, the better the braking ability.

(2) Braking Ability On Ice in the Final Period of Tire Use

A test tire was installed on a passenger car having a cylinder displacement of 1,800 cc and the car was driven on an ordinary public road for a distance of about 10,000 km over a period of about 6 months. The braking test on ice with the above test tire after 10,000 km of driving was conducted in accordance with the same method as that described in (1) above. The result is expressed by an index with reference to the value of the initial period obtained in Comparative Example 1, which is set to 100. The larger the value, the higher the braking ability.

(3) JIS-A Hardness

JIS-A hardness was measured by using a type A of the spring type hardness teser in accordance with JIS K-6301-1995 at 5 locations randomly selected on the tread of a test tire, and the average of obtained values was used.

Examples 1 and 2 and Comparative Example 1

Components were compounded in accordance with the formulations shown in Table 1. Using the obtained tread rubber compositions, studless tires having a size of 185/70R14 were prepared, and the physical properties of the foamed rubber were measured. These tires were inflated to an inner pressure of 0.2 MPa, and the braking ability of the tires on ice was measured. The results are shown in Table 1.

TABLE 1

|  | Example 1 | Example 2 | Comparative Example 1 |
| --- | --- | --- | --- |
| Formulation (parts by weight) | | | |
| natural rubber | 50 | 50 | 50 |
| polybutadiene rubber | 50 | 50 | 50 |
| carbon black*[1] | 45 | 45 | 45 |
| stearic acid | 2 | 2 | 2 |
| zinc oxide | 3.5 | 3.5 | 3.5 |
| antioxidant*[7] | 1.0 | 1.0 | 1.0 |
| vulcanization accelerator CZ*[2] | 0.5 | 0.5 | 0.5 |
| vulcanizatio accelerator DM*[3] | — | — | 1.0 |
| sulfur | 1.0 | 1.0 | 1.0 |
| foaming agent DNPT*[4] | 3.0 | 3.0 | 3.0 |
| urea | 1.5 | 1.5 | 1.5 |
| 4M-DM*[5] | 2.5 | — | — |
| 5M-DM*[6] | — | 2.5 | — |
| Physical properties of foamed rubber | | | |
| expansion ratio (%) | 16 | 16 | 16 |
| JIS-A hardness in initial period | 53 | 53 | 53 |
| JIS-A hardness in final period | 53 | 54 | 58 |
| Braking ability on ice in initial period (index) | 101 | 101 | 100 |
| Braking ability on ice in final period (index) | 97 | 95 | 88 |

*[1]ISAF
*[2]CZ: N-cyclohexyl-2-benzothiazyl-1-sulfenamide
*[3]DM: dibenzothiazyl disulfide
*[2]CZ: N-cyclohexyl-2-benzothiazyl-1-sulfenamide
*[3]DM: dibenzothiazyl disulfide
*[4]DNPT: dinitrosopentamethylenetetramine
*[5]4M-DM: bis(4-methylbenzothiazolyl-2)-disulfide
*[6]5M-DM: bis(5-methylbenzothiazolyl-2)-disulfide
*[7]N-(1,3-dimethylbutyl)-N'-phenyl-p-phenylenediamine
Polybutadiene rubber: BR01 (Japan synthetic Rubber Co., LTD.)

As is shown in Table 1, in the pneumatic tires of the present invention which were used as studless tires, the deterioration in performance on ice or snow in the final period of tire use compared to performance on ice or snow in the initial period of tire use could be suppressed.

As can be understood from the comparative example, the pneumatic tire which was prepared without using the vulcanization accelerator specified by the present invention and used as a studless tire showed deterioration in performance on ice or snow in the final period of tire use compared to performance on ice and snow in the initial period of tire use.

The pneumatic tire of the present invention exhibits an excellent effect in which the deterioration in performance on icy or snowy surfaces in the final period of tire use compared to performance in the initial period of tire use can be suppressed by using the above constitution.

What is claimed is:

1. A pneumatic tire comprising a tire tread wherein said tire tread comprises a foamed rubber layer at least in the portion of said tire tread which substantially contacts a road surface, and wherein said foamed rubber layer comprises closed cells and a solid rubber phase, and has an expansion ratio of about 2% to about 50%, wherein said solid rubber phase comprises a rubber component selected from the group consisting of natural rubber, isoprene rubber, butadiene rubber, ethylene-propylene rubber and a mixture thereof and contains, in an amount of about 0.5 to about 5 parts by weight per 100 parts by weight of the rubber component, a vulcanization accelerator selected from a group consisting of bis(4-methylbenzothiazolyl-2)-disulfide and bis(5-methylbenzothiazolyl-2)-disulfide.

2. A pneumatic tire according to claim 1, wherein the alkyl group represented by $R^1$ and $R^2$ in the general formula is selected from alkyl groups having 1 to 6 carbon atoms.

3. A pneumatic tire according to claim 2, wherein the alkyl group is a methyl group or an ethyl group.

4. A pneumatic tire according to claim 1, wherein the aryl group represented by $R^1$ and $R^2$ in the general formula is selected from aryl groups having 6 to 10 carbon atoms.

5. A pneumatic tire according to claim 4, wherein the aryl group is a phenyl group.

6. A pneumatic tire according to claim 1, wherein JIS-A hardness of the layer of a foamed rubber in the tread in an initial period of tire use is 65 or less.

7. A pneumatic tire according to claim 1, wherein said solid rubber phase further comprises sulfur as a vulcanizing agent.

8. A pneumatic tire according to claim 7, wherein the amount of sulfur is 0.1 to 5 parts by weight per 100 parts by weight of the rubber component.

* * * * *